United States Patent
McNamara et al.

(10) Patent No.: US 10,271,486 B2
(45) Date of Patent: Apr. 30, 2019

(54) INSULATED SHIPPING CONTAINERS MODIFIED FOR HIGH-YIELD PLANT PRODUCTION CAPABLE IN ANY ENVIRONMENT

(71) Applicant: Freight Farms, Inc., Boston, MA (US)

(72) Inventors: Brad McNamara, Boston, MA (US); Jon Friedman, Boston, MA (US)

(73) Assignee: Freight Farms, Inc., Boston, MA (US)

( * ) Notice: Subject to any disclaimer, the term of this patent is extended or adjusted under 35 U.S.C. 154(b) by 0 days.

(21) Appl. No.: 15/077,086

(22) Filed: Mar. 22, 2016

(65) Prior Publication Data

US 2016/0198656 A1  Jul. 14, 2016

Related U.S. Application Data

(63) Continuation of application No. 13/932,984, filed on Jul. 1, 2013, now Pat. No. 9,288,948.

(Continued)

(51) Int. Cl.
*A01G 31/06* (2006.01)
*A01G 9/24* (2006.01)
(Continued)

(52) U.S. Cl.
CPC ............. *A01G 31/06* (2013.01); *A01G 7/045* (2013.01); *A01G 9/16* (2013.01); *A01G 9/24* (2013.01); *A01G 9/246* (2013.01); *Y02A 40/254* (2018.01)

(58) Field of Classification Search
CPC ........ A01G 31/02; A01G 31/00; A01G 31/06; A01G 9/14; A01G 9/16; A01G 9/20; A01G 9/24; A01G 9/246; A01G 9/247; A01G 9/26; A01G 9/00; A01G 7/045; A01G 9/022; F21S 4/00; F21S 4/10; F21S 4/15; F21S 4/20; F21S 4/22; F21S 4/24; F21S 4/26; F21S 4/28
See application file for complete search history.

(56) References Cited

U.S. PATENT DOCUMENTS 3,931,695 A   1/1976   Widmayer
4,569,150 A   2/1986   Carlson et al.
(Continued)

FOREIGN PATENT DOCUMENTS

EP   1210868 A1 *   6/2002   ............. A01G 31/02
GB   2426015          11/2006
(Continued)

OTHER PUBLICATIONS

International Search Report and Written Opinion Issued by the U.S. Patent and Trademark Office as International Searching Authority for International Application No. PCT/US2013/048984 dated Jan. 29, 2014 (10 pgs.).

*Primary Examiner* — Kathleen I Alker
(74) *Attorney, Agent, or Firm* — Arent Fox LLP

(57) ABSTRACT

A system and method for generating high-yield plant production is disclosed. The system includes a container, a growing station, and a monitoring system. The growing station includes vertical racks, a lighting system, an irrigation system, a climate control system, and a ventilation system. The monitoring system monitors all of the systems in the growing station, as well as the environment within the container, to provide real-time data and alerts to a user.

27 Claims, 19 Drawing Sheets

Related U.S. Application Data

(60) Provisional application No. 61/666,354, filed on Jun. 29, 2012.

(51) Int. Cl.
  *A01G 7/04* (2006.01)
  *A01G 9/16* (2006.01)

(56) References Cited

U.S. PATENT DOCUMENTS

| | | | |
|---|---|---|---|
| 4,914,858 A | 4/1990 | Nijssen et al. | |
| 4,965,701 A | 10/1990 | Voland | |
| 5,001,859 A | 3/1991 | Sprung | |
| 5,252,108 A | 10/1993 | Banks | |
| 5,283,974 A | 2/1994 | Graf, Jr. | |
| 5,363,594 A | 11/1994 | Davis | |
| 5,555,676 A | 9/1996 | Lund | |
| 6,021,602 A | 2/2000 | Orsi | |
| 8,327,582 B2 | 12/2012 | Storey | |
| 2004/0201988 A1 | 10/2004 | Allen | |
| 2005/0281027 A1 | 12/2005 | Capen | |
| 2006/0156624 A1 | 7/2006 | Roy et al. | |
| 2009/0025287 A1 | 1/2009 | Lee | |
| 2009/0199470 A1 | 8/2009 | Capen | |
| 2009/0307973 A1 | 12/2009 | Adams | |
| 2010/0001664 A1 | 1/2010 | Shih | |
| 2010/0024292 A1 | 2/2010 | Kertz | |
| 2010/0076620 A1* | 3/2010 | Loebl | A01G 9/26 700/306 |
| 2010/0134025 A1 | 6/2010 | Link | |
| 2011/0035059 A1* | 2/2011 | Ersavas | A01G 1/00 700/276 |
| 2011/0125296 A1* | 5/2011 | Bucove | A01G 7/045 700/90 |
| 2011/0192082 A1* | 8/2011 | Uchiyama | A01G 9/24 47/66.6 |
| 2011/0232186 A1 | 9/2011 | Lewis | |
| 2012/0054061 A1 | 3/2012 | Fok et al. | |
| 2013/0006401 A1* | 1/2013 | Shan | A01G 1/00 700/90 |
| 2013/0093592 A1* | 4/2013 | Lan | A01G 25/167 340/602 |
| 2013/0118070 A1 | 5/2013 | Marquez | |
| 2013/0134880 A1* | 5/2013 | Rea | A01G 7/045 315/112 |
| 2013/0139437 A1* | 6/2013 | Maxik | H05B 37/02 47/58.1 LS |
| 2013/0283689 A1* | 10/2013 | Walliser | A01G 31/02 47/62 R |
| 2014/0000162 A1 | 1/2014 | Blank | |
| 2014/0115958 A1 | 5/2014 | Helene et al. | |
| 2014/0165468 A1 | 6/2014 | Roeser et al. | |
| 2014/0283452 A1 | 9/2014 | Dittman | |
| 2015/0061510 A1* | 3/2015 | Maxik | A01G 7/045 315/153 |
| 2015/0237811 A1* | 8/2015 | Marquez | A01G 9/023 47/66.6 |

FOREIGN PATENT DOCUMENTS

| | | |
|---|---|---|
| GB | 2431328 A | 4/2007 |
| JP | 03-133324 A | 6/1991 |
| JP | 05-076252 A | 3/1993 |
| JP | 2011-097852 A | 5/2011 |
| JP | 2012-080783 A | 4/2012 |
| KR | 10-0481162 B1 | 3/2005 |
| KR | 20110009235 | 9/2011 |
| WO | 2004047521 | 6/2004 |
| WO | 2005079557 | 9/2005 |

* cited by examiner

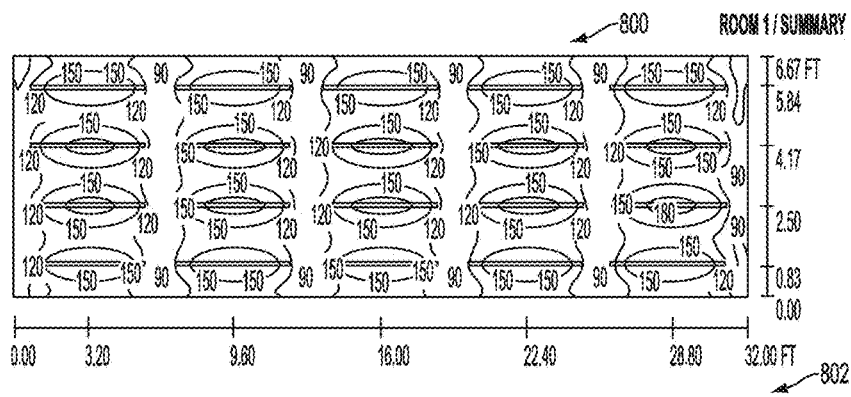

HEIGHT OF ROOM: 1.000 FT, MOUNTING HEIGHT: 1.000 FT, LIGHT LOSS FACTOR: 0.90    VALUES IN LUX, SCALE 1:70

| SURFACE | ρ [%] | $E_{av}$ [lx] | $E_{min}$ [lx] | $E_{max}$ [lx] | u0 |
|---|---|---|---|---|---|
| WORKPLANE | / | 138 | 72 | 191 | 0.522 |
| FLOOR | 80 | 137 | 71 | 184 | 0.517 |
| CEILING | 80 | 106 | 64 | 128 | 0.604 |
| WALLS (4) | 80 | 102 | 64 | 147 | / |

WORKPLANE:
HEIGHT: 0.080 FT
GRID: 128 x 64 POINTS
BOUNDARY ZONE: 0.000 FT

ILLUMINANCE QUOTIENT (ACCORDING TO LG7): WALLS / WORKING PLANE: 0.750, CEILING / WORKING PLANE: 0.771.
PROPORTION OF POINTS WITH LESS THAT 400 lx (FOR IEQ-7): 100.00%.

LUMINAIRE PARTS LIST

| NO. | PIECES | DESIGNATION (CORRECTION FACTOR) | Φ (LUMINAIRE) [lm] | Φ (LAMPS) [lm] | P [W] |
|---|---|---|---|---|---|
| 1 | 20 | PHILIPS GPPM 150cm DR8 120V-2012 (1.000) | 62 | 62 | 43.0 |
|  |  |  | TOTAL: 1240 | TOTAL: 1240 | 860.0 |

SPECIFIC CONNECTED LOAD: 4.03 W/SQ FT = 2.93 W/SQ FT/100 lx (GROUND AREA: 213.45 SQ FT)

ROOM 1 / INPUT PROTOCOL

HEIGHT OF WORKING PLANE: 0.080 FT
BOUNDARY ZONE: 0.000 FT

LIGHT LOSS FACTOR: 0.90

HEIGHT OF ROOM: 1.000 FT
GROUND AREA: 213.45 SQ FT

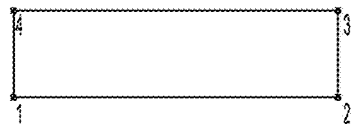

| SURFACE | RHO [%] | FROM ([FT]|[FT]) | TOWARDS ([FT]|[FT]) | LENGTH [FT] |
|---|---|---|---|---|
| FLOOR | 80 | / | / | / |
| CEILING | 80 | / | / | / |
| WALL 1 | 80 | (0.000 | 0.000) | (32.000 | 0.000) | 32.000 |
| WALL 2 | 80 | (32.000 | 0.000) | (32.000 | 6.670) | 6.670 |
| WALL 3 | 80 | (32.000 | 6.670) | (0.000 | 6.670) | 32.000 |
| WALL 4 | 80 | (0.000 | 6.670) | (0.000 | 0.000) | 6.670 |

FIG. 8

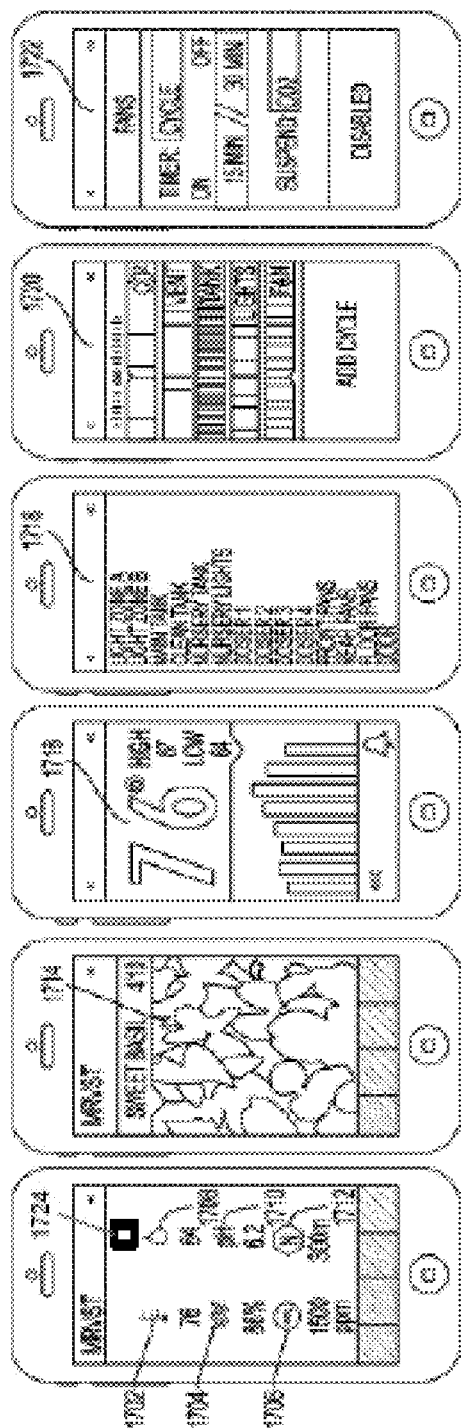

INSULATED SHIPPING CONTAINERS MODIFIED FOR HIGH-YIELD PLANT PRODUCTION CAPABLE IN ANY ENVIRONMENT

CROSS-REFERENCE TO RELATED APPLICATIONS

This application is a continuation application of U.S. application Ser. No. 13/932,984, filed on Jul. 1, 2013, which claims priority under 35 U.S.C. § 119(e) to U.S. Provisional Application Ser. No. 61/666,354, filed on Jun. 29, 2012, all of which are hereby incorporated by reference herein in their entirety.

BACKGROUND

Field of the Disclosure

The present disclosure relates to insulated modular containers modified for high-yield plant production.

Description of Related Art

The need for fresh food is growing as the population increases and changes in the climate impact growing seasons. The current food supply model is economically and environmentally unsustainable because of traditional farming methods and shipping. Operations are usually located in agricultural areas, which still require transportation to distribute their produce. These types of operations require large upfront costs and rely on larger acreage, and have high operational costs from seed to sale. For example, sending fresh food an average of 1500 miles is extremely complicated and adds major expense to a customer's supply chain.

Urban/local agriculture is not the solution as it has the problem of commercial viability. First, there is limited growing space to meet a high demand. Second, high start-up costs of greenhouses and rooftop greenhouses make local crop production impossible for most businesses. For example, structures must be evaluated by structural engineers and often require additional bracing to support the weight. Operational costs of commercial agriculture also require additional labor and infrastructural costs. Third, urban gardens must survey and address contaminated soil which is further costly and time consuming. Offsite operations require additional labor and supplies to reach the same volume, and re-packaging and shipping is an added operating cost.

Hydroponics systems are not the general solution either as most systems are meant to be installed in agricultural settings, are not easily transportable, and require years of education and training.

SUMMARY OF THE INVENTION

A system and method for generating high-yield plant. The system includes at least one modular container, a growing system housed within the container, and a monitoring system. The growing system includes a germination station for nurturing seeds until they germinate into plants, a plurality of vertical racks to hold the plants so that they grow radially outward from the axes of the vertical racks, a lighting system to provide artificial light for the plants, an irrigation system to provide nutrients to the plants, a climate control system to control the environmental conditions within the container, and a ventilation system for providing airflow to the plants in at least two directions. The monitoring system is coupled to the growing system, and monitors and controls at least one of the components of the growing system. The monitoring system also allows the user to control at least one of the components of the growing system.

Further, the system of the present disclosure is configured to include a wireless interface that allows a user to remotely monitor and control any of the components in the growing system or container.

Yet further, the system of the present disclosure is configured to include horizontal light bars mounted on at least one wire from the ceiling of the container.

The system of the present disclosure is configured to include a first set of tubing that delivers nutrient solution from a nutrient reservoir to a section of vertical racks, a second set of tubing that delivers the nutrient solution from the section to each vertical rack in the section, drip emitters coupled to the end of the second set of tubing to control flow of the nutrient solution into each rack, and a plurality of return gutters to collect any unused nutrient solution and return it back to the nutrient reservoir.

Yet further, the system of the present disclosure includes a plurality of fans, a plurality of intermittent fans, and a plurality of air vents to create air flow in at least two different directions in order to create random air flow patterns for the plants.

The system of the present disclosure also allows the monitoring system to change in real-time at least one condition from a set of conditions controlling the germination station, irrigation system, climate control system, ventilation system, and lighting system.

BRIEF DESCRIPTION OF THE DRAWINGS

The present disclosure will further be described by way of example and with reference to the following drawings, in which:

FIG. 8 shows illustrative data that can be stored in the control system in an embodiment.

FIGS. 17A-17F show examples of additional data that can be remotely monitored and controlled via the illustrative monitoring system, all according to embodiments of the present disclosure.

DETAILED DESCRIPTION OF THE INVENTION

The present disclosure is directed to a system and method for modifying a modular container for high-yield plant production. In one embodiment, a hydroponic system can expand to fit any space, and be subsequently started and operated by an individual with minimal training. Another embodiment allows the user to monitor and modify the environment and feeding conditions in order to provide optimal growth conditions for the specific type of plant being grown.

Figure 1:
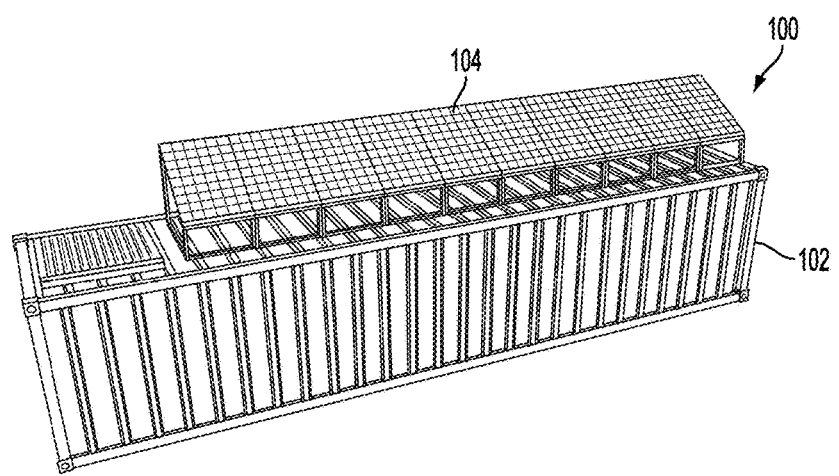
FIG. 1 shows a perspective view of the outside of an illustrative container according to the present disclosure.

FIG. 1 shows a perspective view of the outside of illustrative container 100 according to some embodiments of the present disclosure. In another embodiment, container 100 can also include a water reclamation system (not shown). Container 100 can be a recycled shipping container 102 with standard transnational grade intermodal perishable food-grade insulation foam sandwiched between the steel walls of container 102. Container 102 is also sealed in order to create a solid modular frame for expansion, as well as a controlled growing environment for plants.

In some embodiments, container 102 can be modified to include a solar array 104 to harness solar energy and store it in a converter or batteries for later use. One of ordinary skill in the art would recognize that other energy efficient solutions, such as insulation paint or planting additional crops on top of and around container 102, can also be incorporated into container 102 to make it even more energy efficient. Other renewable energy technologies, such as forms of solar and wind power, could also be added to increase functionality. All of these components can be relocated within the unit, outside the unit, on top of the unit, or next to the unit, to increase space, efficiency, and/or ease of access.

Figure 2:
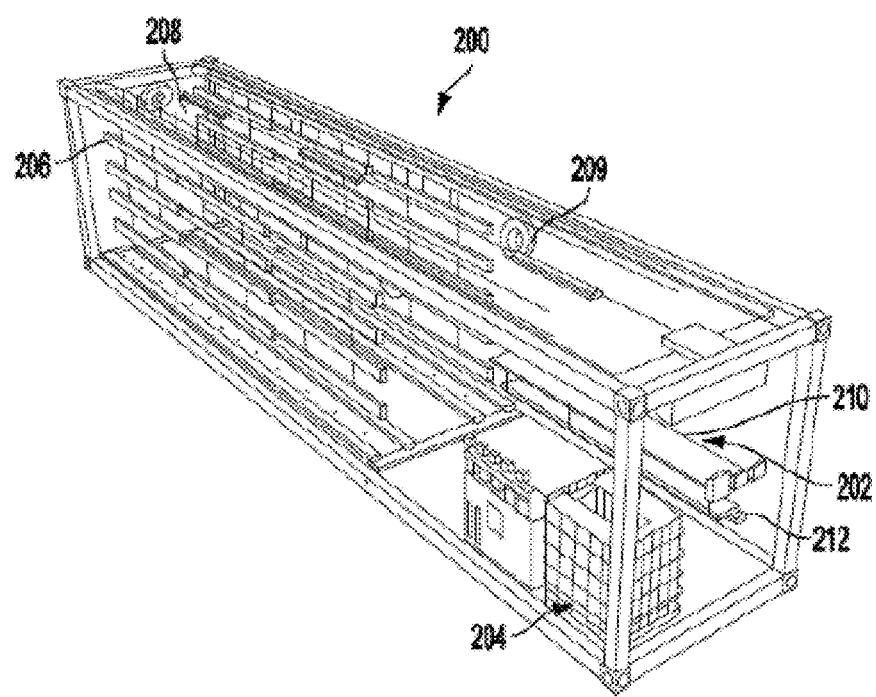
FIG. 2 shows a perspective view of the illustrative growing system inside the container shown in FIG. 1.
Figure 3:
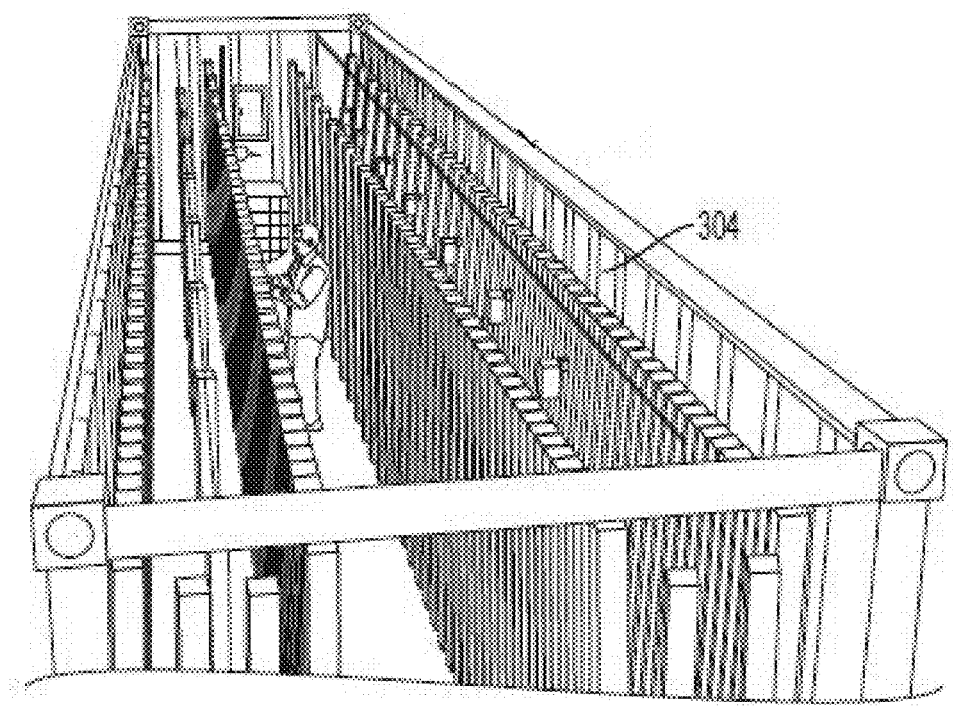
FIG. 3 shows another perspective view of the illustrative growing system inside the container shown in FIG. 1.
Figure 10:
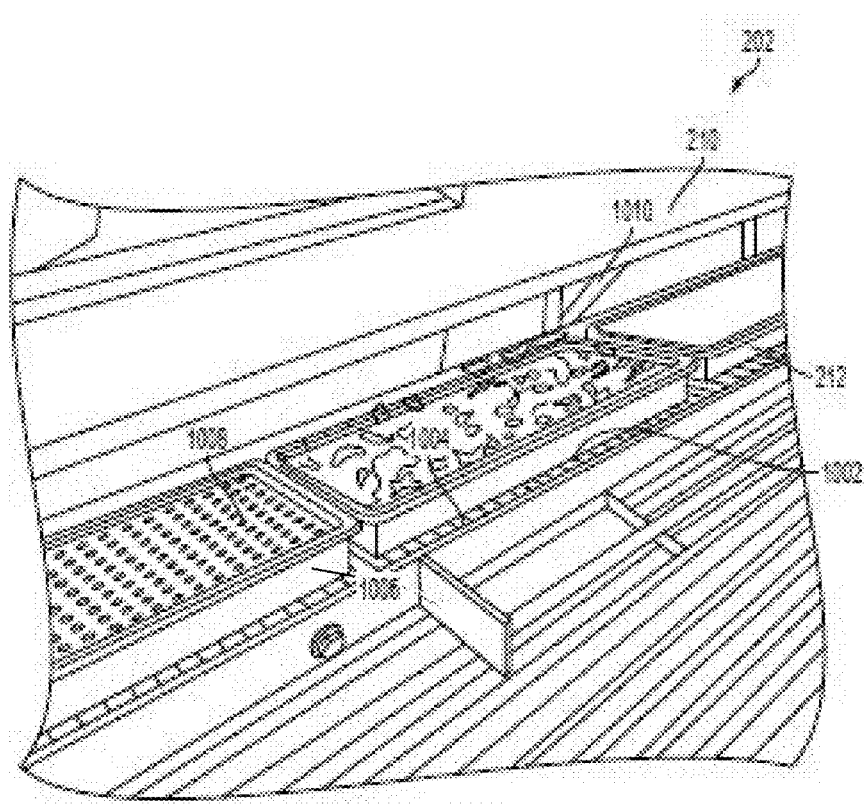
FIG. 10 shows a perspective view of the illustrative germination station.
Figure 18:
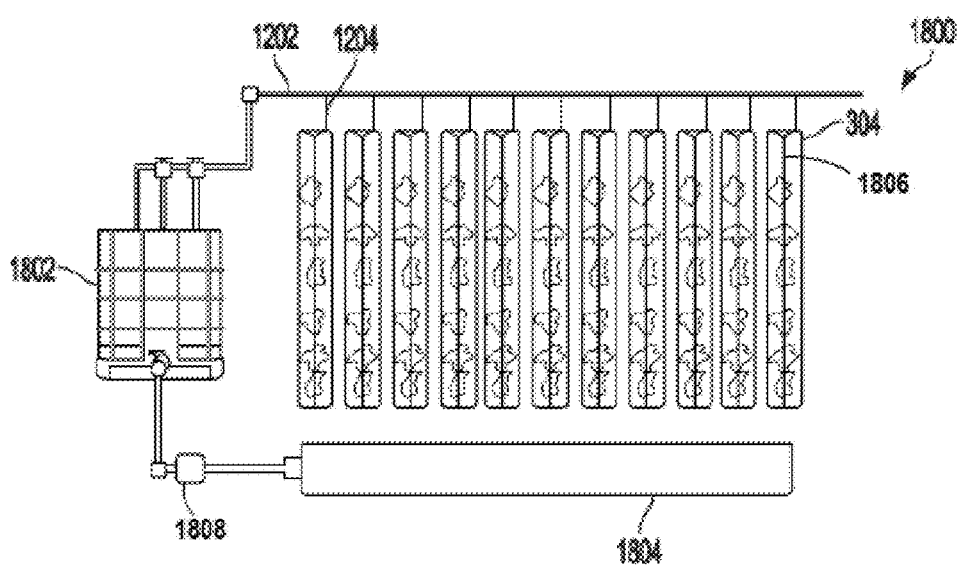
FIG. 18 shows a schematic view of the illustrative irrigation system according to an embodiment of the present disclosure.

FIGS. 2-3 show perspective views of a growing system inside the container in FIG. 1 according to some embodiments of the disclosure. In some embodiments, growing system 200 can include germination station 202, climate control system 204, LED lighting system 206, fan 209, vertical racks 304, and an irrigation system 1800 (FIG. 18). Germination station 202 includes preparation section 210 and nutrient section 212. Referring to FIG. 10, germination station 202 is shown in more detail. Preparation section 210 is configured to hold trays 1002 while they are loaded with a medium 1008 that is optimal for seed germination, such as rockwool cubes. In other embodiments of the disclosure, medium 1008 includes an organic substance such as peat, pine bark, sawdust, and rice hulls. In yet other embodiments of the disclosure, medium 1008 includes a petroleum-based substance such as polymeric foams or plastic beads. In other embodiments, medium 1008 includes inorganic substances that are mineral-based, such as sand, gravel and perlite. One of ordinary skill in the art would recognize that almost any material that supports a root system, other than soil, can be considered a suitable material for medium 1008.

Once the seeds have been placed in medium 1008, tray 1002 is placed in nutrient section 212 until the seeds have germinated. FIG. 10 shows trays 1004 and 1006 placed in nutrient section 212. Tray 1004 includes seeds that have germinated into plants while tray 1006 includes seeds that have just been placed into medium 1008 and have not yet germinated. Nutrient section 212 provides an optimal environment for seed germination by providing light and water/nutrients via irrigation tubes 1010. In some embodiments, germination station 202 utilizes the same type of irrigation system and lighting system that will be discussed later for plants held in vertical racks 304.

Figure 4:
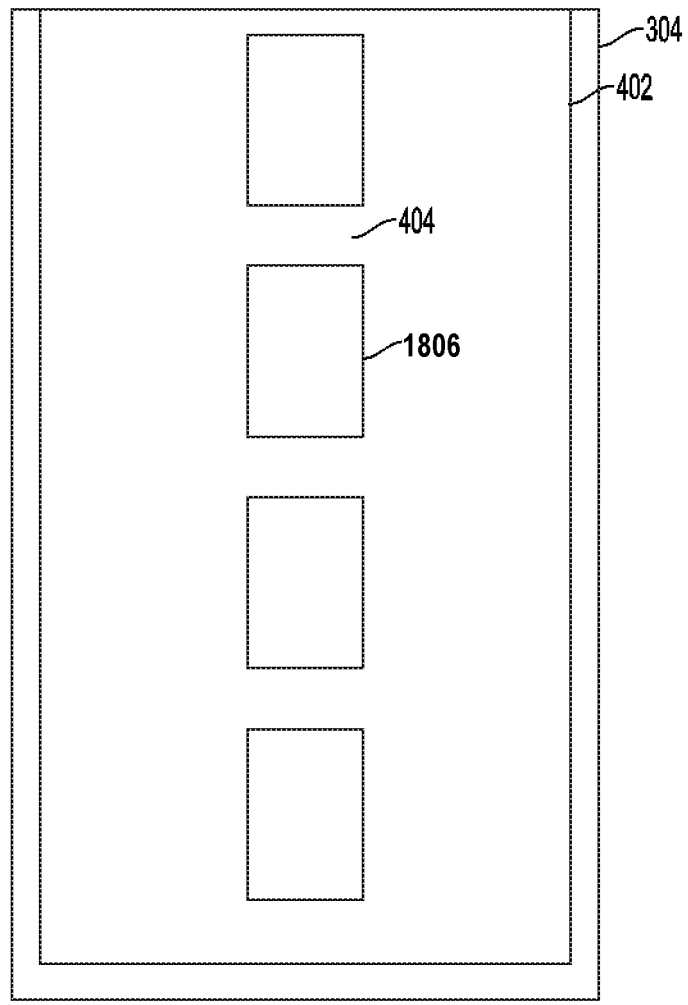
FIG. 4 shows a front elevational view of the illustrative racks shown in FIG. 3.

FIG. 4 shows a front elevational view of the illustrative racks shown in FIG. 3. Vertical racks 304 can include grow channel 402, grow medium 404, and opening for plants 1806. When the seeds have germinated into plants 406, they are taken out of nutrient section 212, placed into grow channel 402 and packed in with grow medium 404. In some embodiments, grow medium 404 is ZIPGROW™ medium (Bright Agrotech LLC, Laramie, Wyo.), which is a reusable synthetic mesh/sponge that slides into grow channel 402 as two halves that come together as they are pulled into grow channel 402. Grow medium 404 is configured to hold the root system of the plants in place.

Figure 15:
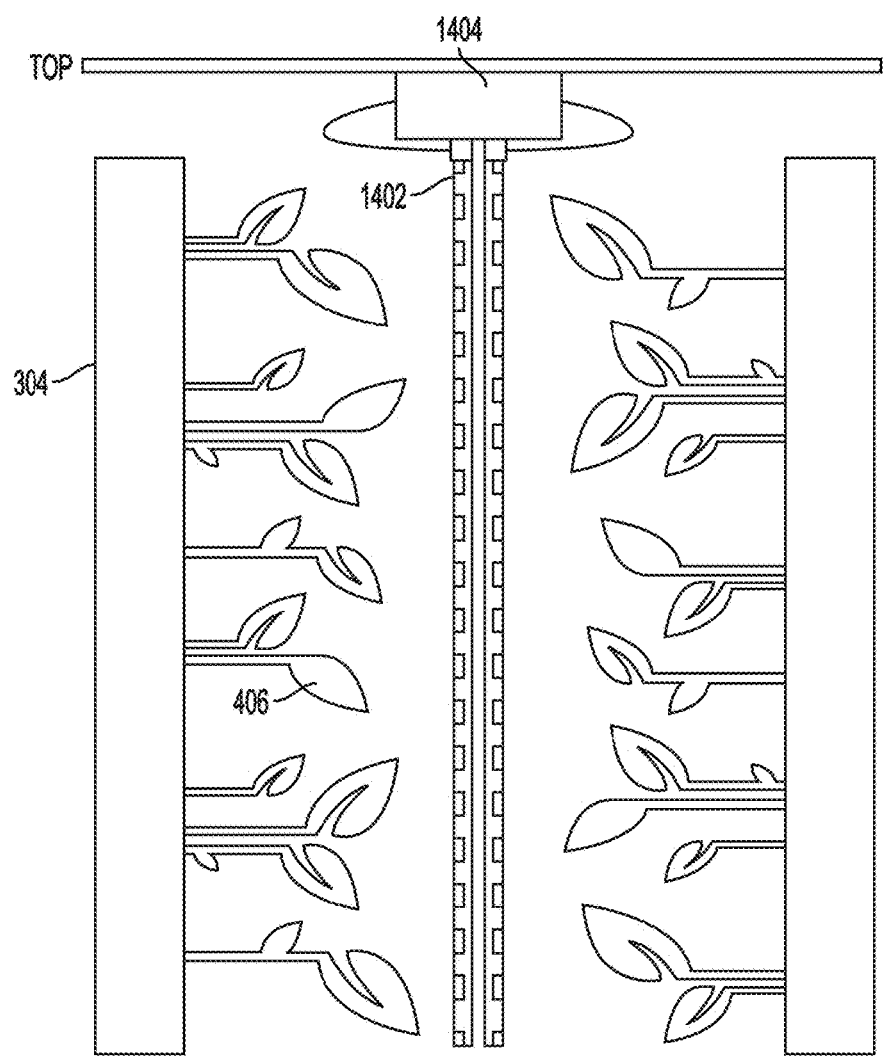
FIG. 15 shows a front elevational view of the illustrative lighting system in FIG. 14.

Vertical racks 304 can be placed in any configuration within container 102 and are configured to hold grow channels 402 in place. Grow channel 402 is removably mounted into vertical rack 304 so that grow channel 402 can be easily removed, replanted, harvested and otherwise worked on without screwing/unscrewing, clipping/unclipping or otherwise changing any parts. In some embodiments, grow channels 402 can be ZWGROW™ grow channels (Bright Agrotech LLC, Laramie, Wyo.), which utilize vertical hydroponic/aquaponic PVC-constructed channels. However, one of ordinary skill in the art would recognize that other grow channels could be used. Each grow channel 402 includes an exterior part and an interior part. The exterior part can hang from ceiling 302 of container 102 for example, by using a pin. The interior part is similarly hung from ceiling 302 of container 102, and can be mounted on an L-shaped bracket that is coupled to ceiling 302. The bottom of both the interior and exterior channels sit in a return channel (not shown) mounted on the floor of container 102. In an exemplary configuration, grow channels 402 are hung vertically in racks 304, side by side, in four rows. In this exemplary configuration, two rows are on the left side and two rows are on the right side, with the open plant growth channels facing in toward each other where the LED lighting system 206 is located, as shown in FIG. 15. The vertical configuration of racks 304 is more space efficient than horizontal racks. For example, in some embodiments of the disclosure, 12-20 plants can be placed in one vertical rack spanning from the floor to the ceiling, and these plants would only need five lights and a single irrigation tube. Furthermore, the vertical configuration of racks 304 eliminates standing water and maintains a high flow rate in order to prevent most problems that are currently associated with commercial hydroponics, such as algae growth, bacteria growth, and irrigation clogging.

The combined configuration of racks 304 and plants 404 also provides advantages. In embodiments of the disclosure, plants 404 are placed in vertical racks 304 so that plants 404 grow radially outward from the axes of racks 304. This configuration provides several advantages over the traditional tray or shelf grow model where plants are simply placed within a horizontal tray or on a horizontal shelf. For example, the traditional tray/shelf configuration causes large areas of uncontrolled standing water. Not only is this not ideal, but it also allows for massive evaporation and requires additional equipment to control humidity. The traditional tray/shelf configuration also typically utilizes a low flow rate. However, a low flow rate encourages algae/bacteria growth and also requires the use of additional equipment to aerate the solution in order to increase its oxygen content. A low oxygen content level would otherwise stunt plant growth. In contrast, the configuration described in embodiments of the disclosure allow for a single point of standing water (nutrient reservoir 1802) that is controlled, filtered and sterilized. By minimizing the exposed water, the configuration can eliminate evaporation and the need for large humidity control equipment. The configuration allows for a high flow rate of solution, which minimizes any algae or bacteria growth and creates a high level of oxygen for increased plant growth.

Furthermore, in the traditional tray/shelf system, the root system is constantly exposed to flowing water, which can cause roots to rot while also preventing airflow through the root structure. The traditional tray/shelf system also has limited space and is not flexible to accommodate various sizes of plants, so smaller plants do not necessarily utilize all of the space allocated to them or might get crowded out by larger plants. In contrast, the configuration in embodiments of the disclosure where plants grow radially outward from vertical racks allows plants to fight multiple stimuli (e.g., air, gravity, light) to create compact, strong stems with a robust and compact root structure. Furthermore, the flexible plant spacing allows for a maximum number of plants per rack, no matter how large or small the plant.

Figure 11:
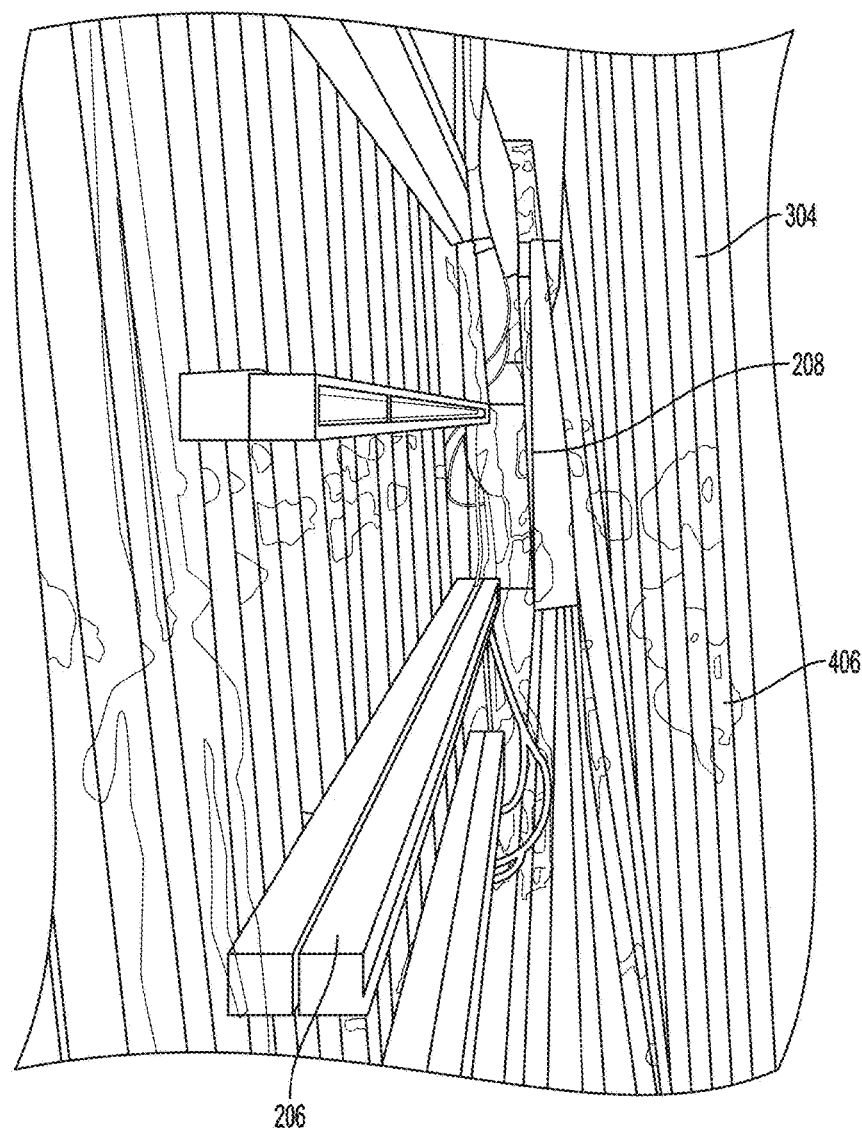
FIG. 11 shows a front elevational view of the illustrative growing system shown in FIG. 2.

The LED lighting system 206 is configured to provide artificial light in a controlled manner for the growth of the plants. In the some embodiments, LED lighting system 206 can utilize five foot long PHILIPS (Amsterdam, Netherlands) LED light bars of Deep Red/Blue 20 150 110 V grow lights. In one configuration, the light bars are mounted horizontally in a back-to-back configuration in two rows, one on each side in between the rows of grow channels 402 that face each other, as shown in FIG. 2. In some embodiments, each section of the LED light bars can be mounted with four back-to-back sets vertically and hung on wires 208. Each section of wire 208 can then be mounted onto a rotating motor on ceiling 302 to pull LED 25 lighting system 206 up and out of the way (like a window shade) for access to the grow channels 402 for removal and work. LED lighting system 206 is further configured to be controlled separately so that lighting in each section of the growing station can be turned on or off, dimmed, or lifted up or down. FIG. 11 shows a front elevational view of the illustrative growing system shown in FIG. 2. Specifically, FIG. 11 shows the exemplary back-to-back sets of LED lighting system 206, hung on wires 208, in between sections of vertical racks 304. The configuration of LED lighting system 206 maximizes space efficiency by using less equipment while simultaneously maximizing the plants' exposure to lights at the right wavelength and spectrum. By maximizing space efficiency, growing system 200 can achieve high plant yields while maintaining relatively low costs and a size that can still fit a modular shipping container. FIG. 11 also shows plants 406 growing radially outward from the grow channels (not shown), which are being held by racks 304.

Figure 14:
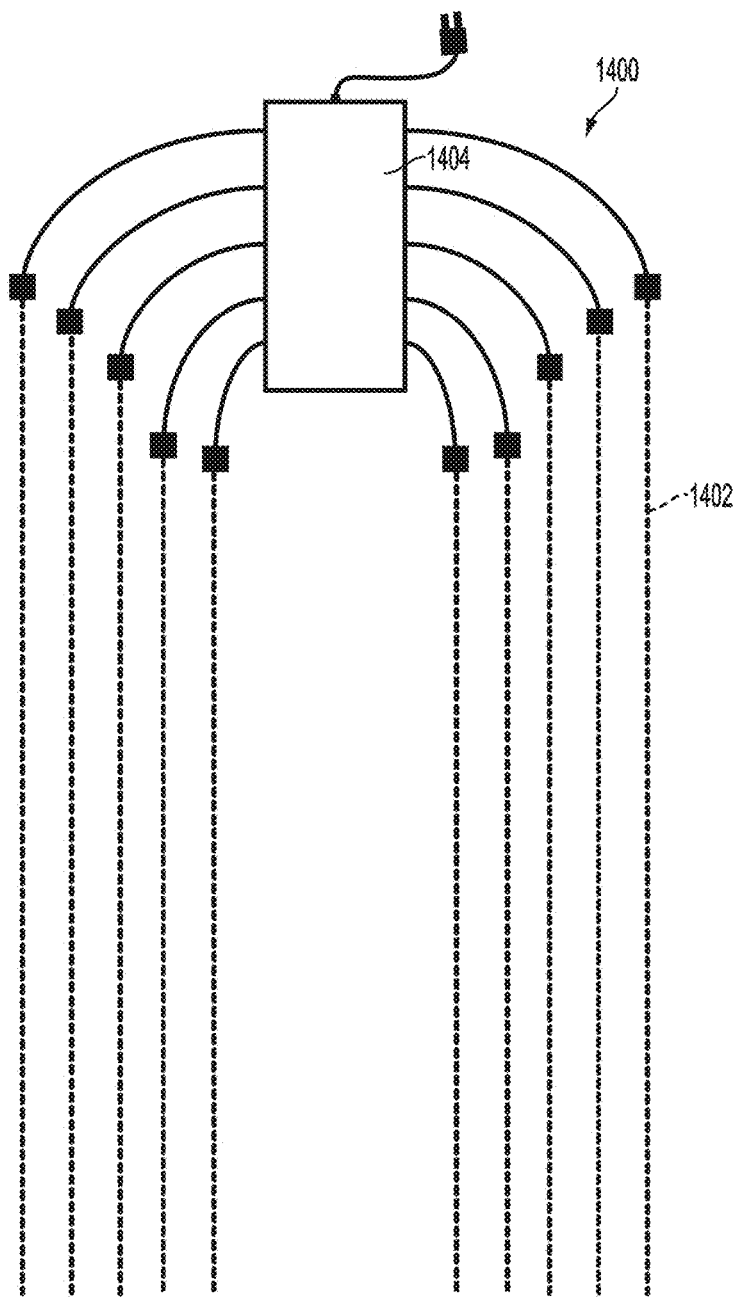
FIG. 14 shows a top level view of another embodiment of the illustrative lighting system.

In other embodiments of the disclosure, and as shown in FIGS. 14-15, LED lighting system 206 can utilize light curtain system 1400 comprising eight foot long PHILIPS (Amsterdam, Netherlands) Interlighting Strips 1402. Strips 1402 preferably comprise LED diodes inside a waterproof coating. In an embodiment of the disclosure, conversion box 1404 is coupled to ceiling 302 of container 102, and strips 1402 are coupled to conversion box 1404 so that they hang downward toward the floor of container 102. Strips 1402 can be joined together, or they can hang with predetermined spacing between each other in order to disperse light through plants 406. There are multiple advantages to using the configuration of light curtain system 1400 which cannot be utilized in other lighting systems. For example, light curtain system 1400 can be used in multiple orientations and can be easily modified for different stages in plant growth and/or for different types of plants being grown in a particular space. This flexibility allows for a more efficient work and grow space, and increases the variety of crops that can be grown. For example, such a configuration eliminates the need for wires, pulleys, or bulking infrastructure that is otherwise necessary for a lighting system. In some embodiments of the disclosure, each strip 1402 hangs freely, can be pushed aside like a bead curtain, and can be easily removed and/or replaced with a simple watertight twist-lock so that an electrician is not needed. In some embodiments of the disclosure, strips 1402 can be upgraded/replaced/changed with new strips with better diodes or diodes that that allow for different spectrums of light based on the crop being grown. Another advantage of light curtain system 1400 is that conversion box 1404 allows for central conversion of AC to DC power. There is electrical waste each time current is converted from AC to DC, so a single point of conversion increases efficiency of the system. Furthermore, a single point of conversion at conversion box 1404 can allow for increased control of each section so that the lights can be turned up or down to accommodate the stage or type of growth of plants in a particular section.

Figure 12:
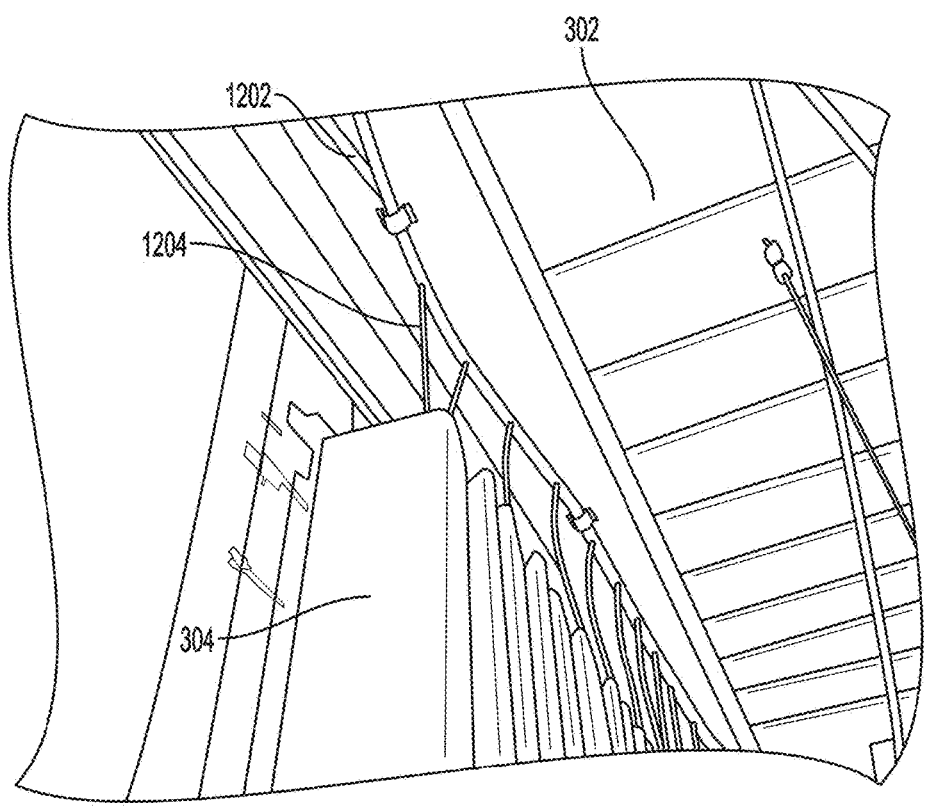
FIG. 12 shows a perspective view of the illustrative irrigation system.

In some embodiments, irrigation system 1800 is used to deliver a water/nutrient solution to the plants. FIG. 12 shows a perspective view and FIG. 18 shows a schematic view of the illustrative irrigation system 1800. Irrigation system 1800 can include nutrient reservoir 1802, nutrient doser (not shown), first set of tubing 1202, second set of tubing 1204, pump 1808, drip emitters (not shown), and return gutters 1804. In some embodiments, nutrient reservoir 1802 can be a 330 gallon tank with a reverse osmosis filter. Nutrient reservoir 1802 can be coupled to a nutrient doser (not shown), which controls the flow of nutrients into nutrient reservoir 1802 in order to maintain specific nutrient levels prescribed by the user.

The nutrient doser (not shown) is programmable to provide different levels and types of nutrients depending on the type of plant being grown for optimal growth. The nutrient doser (not shown) can control all types of nutrients, such as, for example, phosphates, nitrates, trace minerals. The nutrient doser (not shown) can also be configured to control and maintain characteristics of the water/nutrient solution such as pH and acidity based on prescribed levels by the user. In some embodiments of the disclosure, the nutrient doser (not shown) is configured to use a simple one-part nutrient solution, while giving more advanced users the option to experiment with additives and trace minerals based on desired characteristics of plant growth and taste.

Irrigation system 1800 can also include a first set and second set of tubing 1202 and 1204 for delivery of water/nutrient solution to grow channels 402 in racks 304. First set of tubing 1202 can be one-half inch tubing coupled to ceiling 302 of container 102, and can carry water/nutrient solution from nutrient reservoir 1802 to each section of grow channels 402. Second set of tubing 1204 can be one-quarter inch tubing that carries water/nutrient solution from each section of grow channels 402 to each individual grow channel 402 in rack 304. The sizes of the tubing are exemplary only and can be modified and adjusted by one of ordinary skill in the art. Furthermore, one of ordinary skill in the art would recognize that one set of tubing, or more than two sets of tubing, could be used as well. Pump 1808 can be utilized at the point of origin at nutrient reservoir 1802 to regulate the rate of water/nutrient flow through first set of tubing 1202. Drip emitters (not shown) may also be affixed to the ends of the second set of tubing 1204 to control the water/nutrient flow at the point of release into each grow channel 402.

In some embodiments, return gutters 1804 are utilized to catch unused water/nutrient solution that flows through grow channel 402 and return it to nutrient reservoir 1802. Return gutters 1804 can be coupled to the floor of the container 102 and can be positioned beneath and/or integrated with the terminating section of grow channel 402. In some embodiments, the collected unused water/nutrient solution flows downhill through return gutters 1804 and back into nutrient reservoir 1802. Alternatively, a collection point/return tank can accumulate the unused nutrient solution and utilize a pump to transport the solution back to the reservoir.

In order to control the internal environment of container 102, the hydroponic system can include climate control system 204 (FIG. 2) that can measure and control humidity, carbon dioxide levels, temperature, and other related environmental factors.

Figure 5:
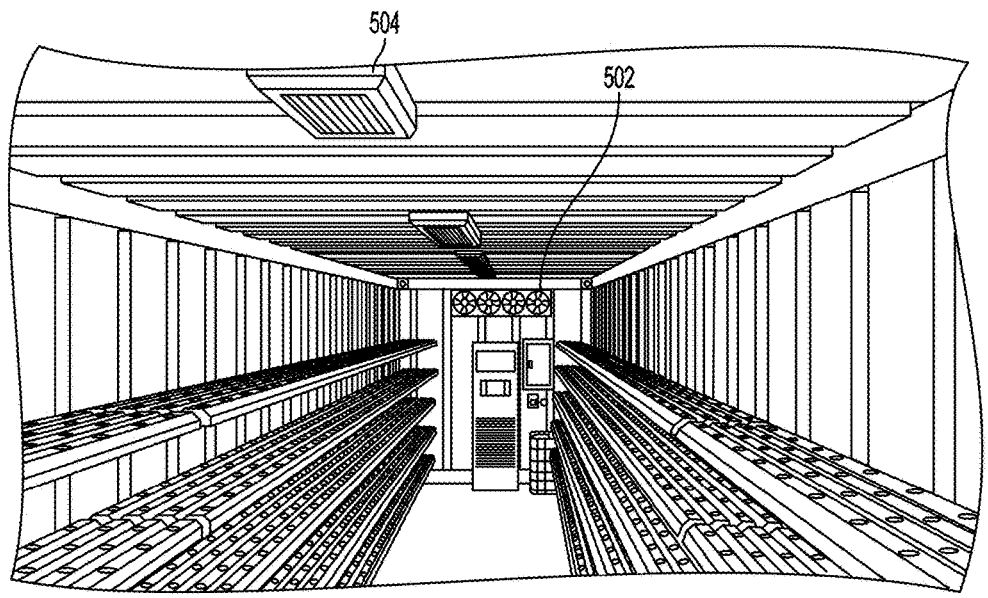
FIG. 5 shows a perspective view of the illustrative ventilation system in the container.
Figure 13:
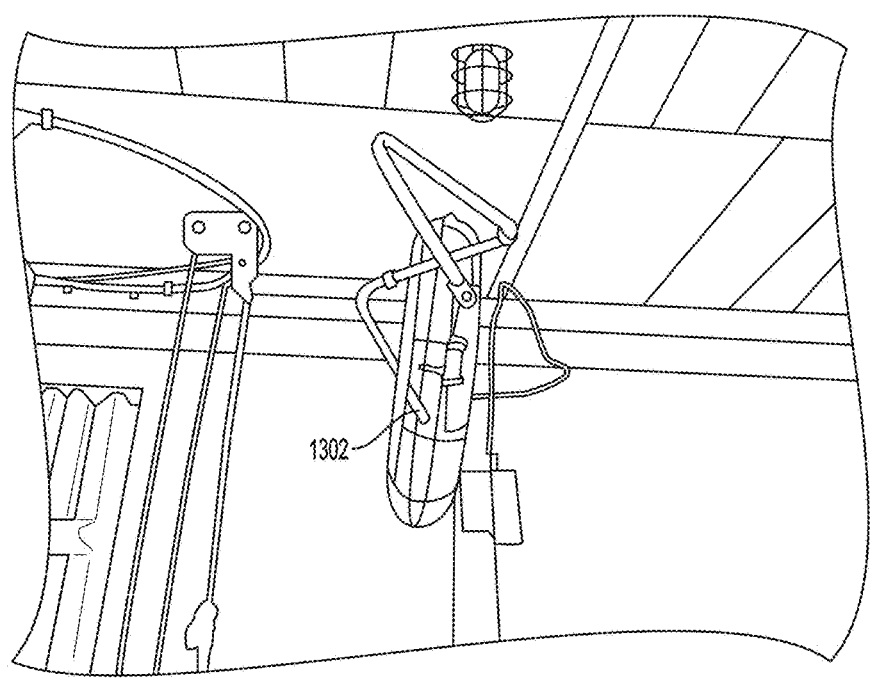
FIG. 13 shows a perspective view of the illustrative ventilation system shown in FIG. 5.

In some embodiments, the hydroponic system also can include a ventilation system having a main fan and a plurality of intermittent fans. FIGS. 5 and 13 show perspective views of a ventilation system according to some embodiments of the present disclosure. The ventilation system can include main fans 502, intermittent fans 1302, and air vents 504. External air is taken in by main fans 502 at one end of container 102, is pushed through container 102 via intermittent fans 1302, and then exhausted from container 102 at the opposite end. Intake air is preferable run through several High Efficiency Particulate Air (HEPA) charcoal filters at main fans 502 and exhaust air is preferably run through micro screen charcoal filters. In some embodiments, ventilation system utilizes additional air vents 504 coupled to ceiling 302 of container 102 to create a dual airflow system. Current greenhouse solutions, such as direct fans, indirect fans, and mass ventilation/exhaust systems were tested, but all were inferior to the dual airflow system in the present disclosure. The dual airflow system is generated from the vertical air flow from vents 504 and horizontal air flow from main fans 502 and intermittent fans 1302. In other embodiments of the disclosure, additional fans and/or vents are positioned in or on the floor of container 102 to blow air vertically from the ground up between rows of racks 304. Providing air flow in more than one direction is preferable in order to further create actual conditions that plants would encounter outdoors. Furthermore, the chaotic and random air flow patterns that are generated stimulate the plants and force them to grow stronger and denser stems and leaves. The dual airflow system is not possible with traditional horizontal rack systems because the racks would block the vertical flow of air and each rack would need its own fan/airflow source. In contrast, in embodiments of the disclosure, the vertical configuration of the racks along with the added vertical flow of air allows for air flow through the plant stems and maintains a constant flow throughout dense vegetation. Furthermore, the added vertical air flow, on top of the existing horizontal air flow, directly cools lighting while also providing an ideal level of stress to the plants, creating stronger cell walls in the plants. Stronger cell walls allow for a stronger root structure, which can support the growth of larger plants.

Figure 19:
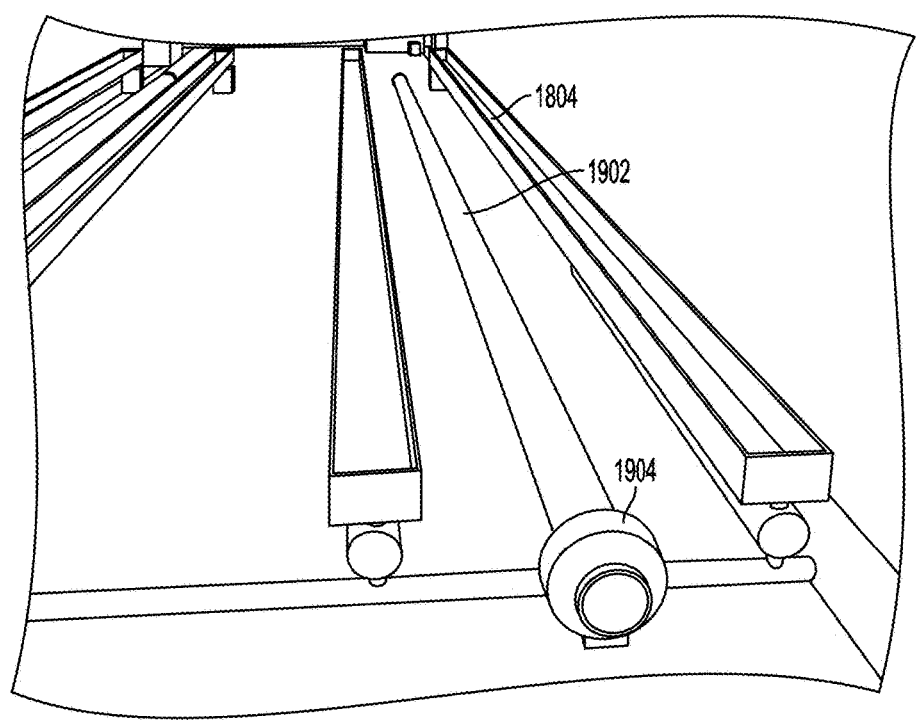
FIG. 19 shows a perspective view of another embodiment of the illustrative ventilation system.

In another embodiment of the disclosure shown in FIG. 19, the ventilation system can also include tube 1902, which spans along the floor of container 102 in any direction. In one embodiment of the disclosure, tube 1902 is positioned between, and is parallel to, gutters 1804. Tube 1902 includes end 1904, which is configured to receive a fan unit (not shown), as well as perforations (not shown) along the length of tube 1902. When the fan unit (not shown) is turned on, air is circulated along the length of tube 1902, and is released upward through the perforations (not shown) along tube 1902 as an alternative or additional vertical air source. One of ordinary skill in the art would recognize that air can flow vertically from either the ceiling to the floor, or from the floor to the ceiling, of container 102. One of ordinary skill in the art would also recognize that air flow in the horizontal and vertical directions is just an example and the embodiment is not limited to only two directions, nor is it limited to those two particular directions.

Figure 6:
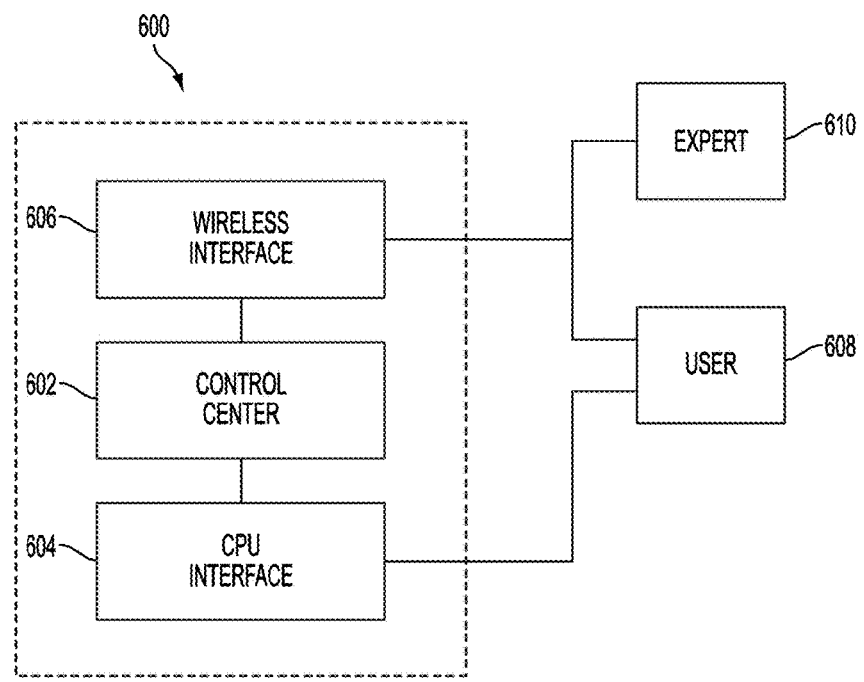
FIG. 6 shows an illustrative system diagram of the monitoring system.
Figure 7:
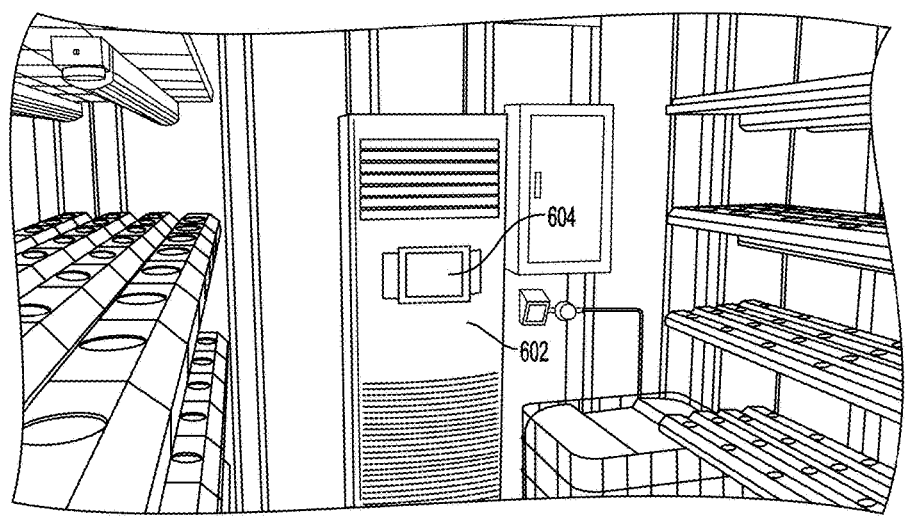
FIG. 7 shows a front elevational view of the illustrative monitoring system.

In some embodiments, the components in container 102 can be coupled to monitoring system 600. FIG. 6 shows an illustrative system diagram of monitoring system 600 and FIG. 7 shows a front elevational view of monitoring system 600. Monitoring system 600 can include control center 602, CPU interface 604, and wireless interface 606 to allow user 608 to access the system remotely. Control center 602 preferably monitors and controls all of the components based on specifications set by user 608. For example, control center 602 can monitor climate control system 204 and change humidity, carbon dioxide levels, temperature, and other factors in order to remain within user-specified measurements. In another example, control center 602 is coupled to LED lighting system 206 to control lighting based on various factors, such as time of day. In yet another example, control center 602 is coupled to irrigation system 1800 to ensure that the proper nutrient concentration for a specific crop is being maintained in nutrient reservoir 1802. Control center 602 can also monitor and control the amount of solution being dripped onto specific sections of grow channels 402, or specific grow channels 402 themselves. In yet another example, control center 602 can be coupled to the ventilation system to ensure the proper airflow is being maintained for various sections of plants. The above are just illustrative examples of components that can be monitored and controlled in order to ensure maintenance of optimal growing conditions specified by the user.

CPU interface 604 allows user 608 to have direct access to control center 602, and wireless interface 606 allows user 608 to have remote access to control center 602. Either connection allows user 608 to modify any pre-set levels, override pre-set levels, or simply monitor activity in container 102. Wireless interface 606 allows for control center 602 to provide remote alerts to user 608, giving user 608 the ability to change or override any preset characteristics. Referring to FIG. 8, an example of data 800 available to user 608 is shown. For example, available data 800 includes summary data 802 and input protocol data 804. Summary data 802 can provide user 608 with data on environmental conditions and plant growth. Input protocol data 804 is more flexible, and allows user 608 to input data to change environmental conditions or component performance.

FIGS. 16-17 show examples of the types of data that can be remotely monitored and controlled via monitoring system

Figure 16A:
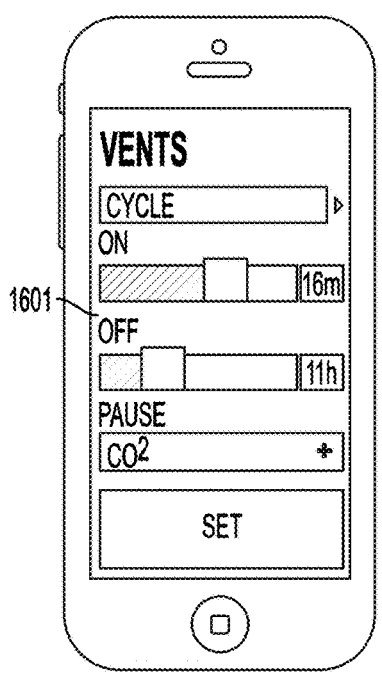
FIGS. 16A-16B show examples of data that can be remotely monitored and controlled via the illustrative monitoring system, all according to embodiments of the present disclosure.
Figure 16B:
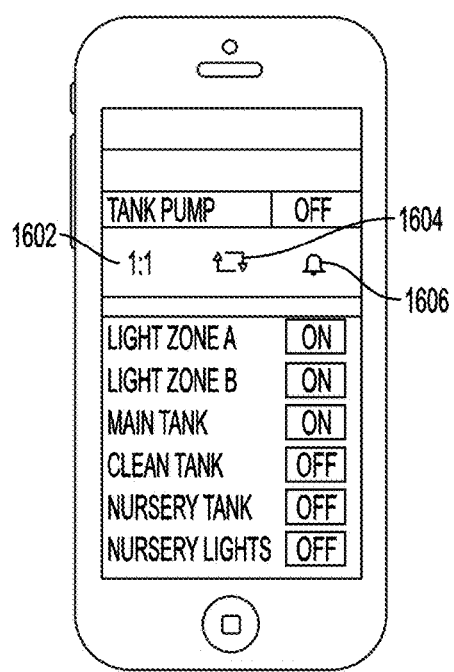

600. For example, FIG. 16A illustrates various vent cycle characteristics 1601 that can be remotely set and modified with respect to the vents in an embodiment of the disclosure. FIG. 16B shows examples of various systems that can be remotely monitored and controlled. As shown in FIG. 16B, when a system is selected, an exemplary set of icons 1602, 1604, 1606, pertaining to the selected system are displayed. For example, if the tank pump system is selected, an embodiment of monitoring system 1600 might display relationship icon 1602, cycle icon 1604, and alarm icon 1606. Relationship icon 1602 describes the relationship that has been set up to determine what conditions should occur for a corresponding action to be triggered. Cycle icon 1604 allows the user to specify the number or frequency of cycles to run a particular system. Alarm icon 1606 allows the user to specify the scenarios for which monitoring system 600 should alert the user for a particular system. FIGS. 17A-F illustrate screenshots of various other types of remote monitoring that can be utilized by the user. FIG. 17A shows a screen shot of exemplary air and water data that can be reported to the user. Such data can include air temperature 1702, air flow 1704, carbon dioxide levels 1706, water temperature 1708, pH level 1710, humidity 1724, and nutrient conductivity 1712. 17B shows a live video feed 1714 of sweet basil plants. Monitoring system 600 can also provide video feeds of other zones of crops being grown in container 102 in order to allow a user to monitor different zones of different crops or different zones of the same crop. FIG. 17C shows an example of alarm function 1716 in monitoring system 600. In this example, the user has configured alarm function 1716 to notify the user when the air temperature has exceeded 82 degrees F. or has dropped below 64 degrees F. FIG. 17D illustrates additional systems 1718that can be remotely monitored and controlled, FIG. 17E shows systems 1720 that can be monitored by cycles, and 17F shows an example of the controls 1722 for setting cycles for a particular system.

In another embodiment, the wireless connection in wireless interface 606 allows for an additional party, such as off-site harvest expert or hydroponics expert 610, to communicate with user 608 and review all of the data and conditions that are available to user 608.

One of ordinary skill in the art would recognize that the monitoring system could monitor, control, and change any additional components that affect the environment or feeding conditions. In order to maintain conditions or provide alerts, control center 602 can include algorithms relating to environmental conditions prescribed by the user. In one embodiment, control center 602 utilizes a series of if-then relationships to maintain optimal conditions. For example, if humidity within container 102 falls below a set limit, for example, 60%, then control center 602 activates the humidifier until the humidity level stabilizes. In another example, if the temperature within container 102 rises above a set limit, for example, 85 degrees F. or falls below a set limit, for example, 66 degrees F., then control center 602 activates climate control system 204 until the temperature stabilizes. Monitoring system 600 can also be configured to capture visual records of plant growth, and record and report all data points for conditions that the monitoring system controls. The system may also be configured to issue alerts based on the if-then relationships described above to alert the user of system failures, changes in conditions, or other variations from levels prescribed by the user. All of these variables can be changed based on the crop desired and the optimal environmental and feeding conditions for that crop.

In one embodiment, assembly of the hydroponic unit starts with obtaining a new or used insulated shipping container 102 that implements vents on each door and preferably has vents on each wall. In one example, there is an average of one vent per ten feet. An electrical panel, such as a 200 amp, 240 volt panel, can be coupled to one of the walls of container 102 for power. A Heating, Ventilation and Air Conditioning (HVAC) unit or other climate control unit 204 and main fan 502 can also be coupled to one of the walls of container 102. Intermittent fans 1302 can be installed every ten to twenty feet to allow for proper air circulation.

Racks 304 for the growing system can then be installed within container 102, followed by grow channels 402. Grow channels 402 and racks 304 can be configured vertically in order to increase plant yield and improve usability. However, the grow channels 402 and racks 402 can be moved, changed and/or reconfigured to increase the efficiency of the interior space. Once these systems are assembled, they are connected to the nutrient reservoirs 1802, dosers (not shown), and other components of the irrigation system. The LED lighting system 206 is then set up at a proper distance from the growing system to allow for optimum conditions for plant production. Climate control system 204 and monitoring system 600 can then be installed within container 102 to ensure that all of the necessary components are being controlled and monitored. Cameras can also be installed and connected to the CPU to ensure that a live feed or time-lapse pictures can be provided to a remote user.

Figure 9:
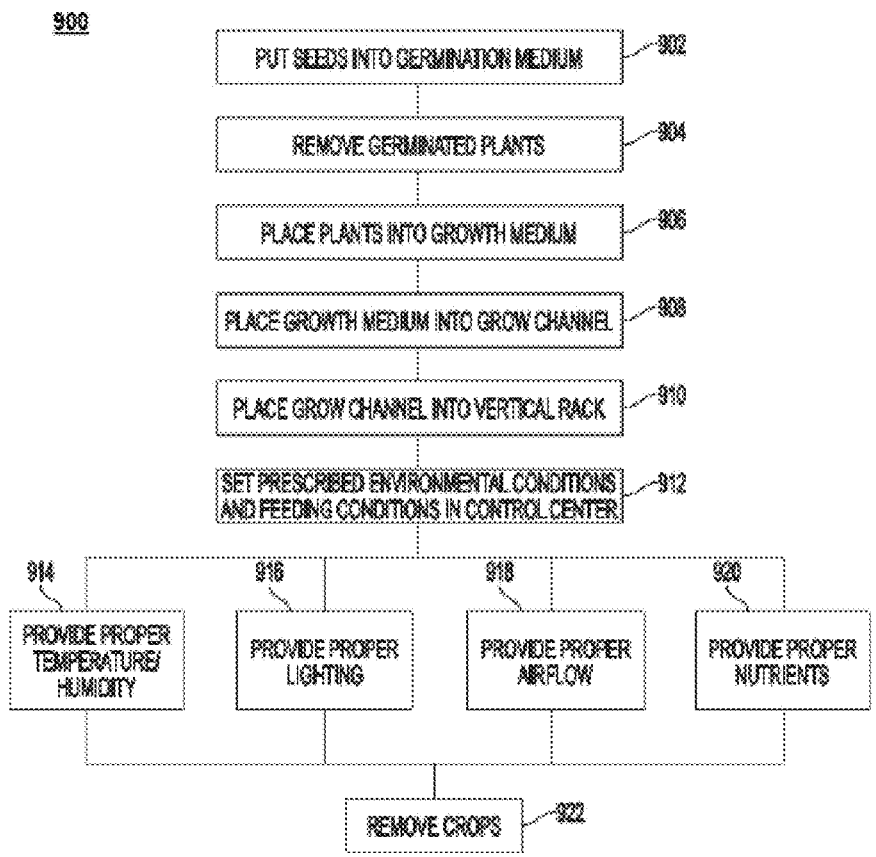
FIG. 9 shows an illustrative flow diagram of the process for growing plants in an embodiment.

FIG. 9 shows an illustrative flow diagram of the process 900 for growing plants in an embodiment of the invention. In step 902, seeds are placed into germination medium 1008 and provided with nutrients for a specified duration of time until they have germinated into plants. In step 904, the plants are removed from germination medium 1008. In steps 906-908, the plants are packed into the grow medium 404 and placed in grow channels 402. In step 910, grow channels 402 are coupled into vertical racks 304 so that the plants grow radially outward from the axes of vertical racks 304. In step 912, the user programs control center 602 with specific environmental conditions to be monitoring and maintained. In steps 914-920, control center 602 drives exemplary environmental factors, such as temperature, humidity, lighting, nutrients/water, and airflow so that they are all within levels prescribed by the user. Once the plants have either spent a specified duration of time in racks 304 or grown to a specified size, they are then removed from racks 304 and grow channels 402 in step 922.

The hydroponic system can be configured to produce all plants other than crops that are grown for their edible roots, i.e., root crops. For example, the hydroponic system can produce: all types of lettuce; all types of herbs such as basil, oregano, mint, parsley, rosemary, thyme, and chive; all types of leafy greens such as kale, chard, spinach and arugula; all vine crops such as strawberries, tomatoes, and peppers; cucumbers; and mushrooms. One of ordinary skill in the art would recognize that these are just examples of non-root crops, and the disclosure is not meant to be limited to these exemplary crops only. The hydroponic system can also be configured to utilize fish tanks in order to raise various forms of seafood, such as fish, shrimp and lobsters.

The disclosed system can provide a high efficiency output as plants can be harvested and new plants can begin the cycle all in the same space at the same time. In one example of an embodiment, one acre of the disclosed hydroponic system provides a projected annual yield of approximately 5.4 million heads of lettuce while one acre of traditional agricultural farming provides a projected annual yield of approximately 30,000 heads of lettuce. In another example, one acre of the disclosed hydroponic system provides a projected annual yield of approximately 1.7 million pounds of basil while one acre of traditional agricultural farming provides a projected annual yield of approximately 32,500 pounds of basil. In yet another example, 320 square feet of the disclosed hydroponic system provides a projected annual yield of approximately 40,000 heads of lettuce while 320 square feet of traditional greenhouse farming provides a projected annual yield of approximately 6,800 heads of lettuce. Not only does the disclosed hydroponic system in the previous examples provide a much higher annual yield of crops, but it is also able to do so with fewer resources. For example, one acre of the disclosed hydroponic system projects to utilize approximately 163,350 gallons of water annually while one acre of traditional agricultural farming projects to utilize approximately 488,772 gallons of water annually.

Although the above description describes embodiments of the invention, it should be understood that the techniques and concepts are applicable to growing systems in general. Thus the invention may be embodied in other specific forms without departing from the spirit or essential characteristics thereof.

While the above describes a particular order of operations performed by a given embodiment of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the present invention has been described in the context of a method or process, the present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium including, without limitation, any type of disk including optical disks, CD-ROMs, and magnetic-optical disks, read-only memory (ROM), random access memory (RAM), magnetic or optical cards, or any type of media suitable for storing electronic instructions.

What is claimed is:

1. A modular system for high-yield plant production, the system comprising at least one modular container, each modular container comprising:
    a germination station;
    a plurality of vertical racks for plants, the racks arranged in a plurality of rows, the racks configured to hold a plurality of grow channels, each grow channel comprising a vertically disposed channel opening for plants to grow outwardly from a vertical axis of the grow channel;
    a lighting subsystem comprising vertical freely hanging LED lights adapted for the growth of plants and disposed between the rows facing the vertical racks;
    an irrigation subsystem configured to deliver a water/nutrient solution to an upper end of each grow channel;
    a climate control subsystem;
    a ventilation subsystem configured to provide vertical airflow between said rows of vertical racks and past the vertically disposed channel openings in the plurality of grow channels; and
    a monitoring subsystem configured to monitor and control at least one of the germination station, the irrigation subsystem, the climate control subsystem, the ventilation subsystem and the lighting subsystem to maintain and/or change a set of conditions prescribed by a user;
    wherein the system is configured to allow simultaneous plant germination, growth, and harvesting within the at least one modular container.

2. The modular system of claim 1, wherein the plurality of vertical racks form a planar array of vertically hanging grow channels.

3. The modular system of claim 2, wherein the openings for plants are disposed on one side of the array.

4. The modular system of claim 3, wherein the at least one modular container comprises two or more of said planar array of vertically hanging grow channels, and the openings for plants from adjacent arrays face each other.

5. The modular system of claim 4, wherein said LED lights are disposed between said adjacent arrays where the openings for plants face each other.

6. The modular system of claim 4, wherein the ventilation subsystem circulates air vertically between said adjacent arrays where the openings for plants face each other.

7. The modular system of claim 4, wherein the at least one modular container comprises four of said array arranged in two pairs of arrays, wherein the openings for plants from adjacent arrays of each pair face each other, and wherein the LED lights are disposed between said adjacent arrays of each pair where the openings for plants face each other.

8. The modular system of claim 1, wherein the vertical racks are reconfigurable within the at least one modular container.

9. The modular system of claim 1, wherein the ventilation subsystem is configured to provide horizontal air flow and vertical air flow.

10. The modular system of claim 1, wherein the at least one modular container is insulated.

11. The modular system of claim 1, wherein the modular system is capable of growing at least about 125 heads of lettuce per square foot per year.

12. The modular system of claim 1, wherein the modular system uses not more than about 3.75 gallons of water per square foot per year when operating at capacity.

13. The modular system of claim 1, wherein the at least one modular container comprises two or more modular containers.

14. The modular system of claim 1, further comprising a mobile app that controls the monitoring subsystem.

15. The modular system of claim 14, wherein the mobile app provides control of ventilation cycle on and off times.

16. The modular system of claim 14, wherein the mobile app provides control of $CO_2$ level within the at least one modular container.

17. The modular system of claim 14, wherein the mobile app provides control of an irrigation subsystem pump.

18. The modular system of claim 14, wherein the mobile app provides separate control of a main growing area and a nursery area.

19. The modular system of claim 14, wherein the mobile app provides control of humidity and temperature within the at least one modular container.

20. The modular system of claim 14, wherein the mobile app provides control of water pH within the irrigation subsystem.

21. The modular system of claim 14, wherein the mobile app provides live feed or time-lapse pictures of plants growing within the at least one modular container.

22. The modular system of claim 1, further comprising plants growing within the at least one modular container.

23. The modular system of claim 22, wherein the at least one modular container comprises plants at different stages of the plant life cycle.

24. The modular system of claim 22 comprising one or more types of plants selected from the group consisting of lettuce, basil, oregano, mint, parsley, rosemary, thyme, chive, kale, chard, spinach, arugula, strawberries, tomatoes, peppers, cucumbers, and mushrooms.

25. The modular system of claim 1, wherein each said vertical rack comprises a grow channel and a synthetic grow medium disposed within the grow channel.

26. The modular system of claim 25, wherein each plant has a root system and said grow medium is configured to hold the root systems of the plants in place.

27. The modular system of claim 1, wherein said vertical freely hanging LED lights comprise different spectra of light.

* * * * *